United States Patent
Asai et al.

(10) Patent No.: US 10,369,912 B2
(45) Date of Patent: Aug. 6, 2019

(54) TORQUE TRANSFER CONTROL MECHANISM AND SEAT STRUCTURE

(71) Applicant: Delta Tooling Co., Ltd., Hiroshima-shi (JP)

(72) Inventors: Terumi Asai, Aki-gun (JP); Etsunori Fujita, Higashihiroshima (JP); Katsuhiro Inoue, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 15/519,196

(22) PCT Filed: Aug. 24, 2015

(86) PCT No.: PCT/JP2015/073643
§ 371 (c)(1),
(2) Date: Apr. 14, 2017

(87) PCT Pub. No.: WO2016/059875
PCT Pub. Date: Apr. 21, 2016

(65) Prior Publication Data
US 2017/0240069 A1    Aug. 24, 2017

(30) Foreign Application Priority Data

Oct. 16, 2014    (JP) .................................. 2014-211637

(51) Int. Cl.
*B60N 2/22*       (2006.01)
*G05G 5/18*       (2006.01)
(Continued)

(52) U.S. Cl.
CPC ............. *B60N 2/938* (2018.02); *B60N 2/167* (2013.01); *B60N 2/168* (2013.01); *B60N 2/1615* (2013.01);
(Continued)

(58) Field of Classification Search
CPC ........ B60N 2/02; B60N 2/1615; B60N 2/167; B60N 2/168; B60N 2/1685; B60N 2/169;
(Continued)

(56) References Cited

U.S. PATENT DOCUMENTS

| | | | | |
|---|---|---|---|---|
| 6,007,152 | A  * | 12/1999 | Kojima | B60N 2/236 297/367 R |
| 6,626,495 | B2 * | 9/2003 | Okazaki | B60N 2/2356 297/367 R |

(Continued)

FOREIGN PATENT DOCUMENTS

| | | | | |
|---|---|---|---|---|
| FR | 2921597 A1 * | 4/2009 | | F16D 41/16 |
| JP | 2002-177083 A | 6/2002 | | |

(Continued)

OTHER PUBLICATIONS

Machine translation of FR 2921597 A1 obtained on Jul. 2, 2018. (Year: 2018).*

(Continued)

*Primary Examiner* — Adam D Rogers
(74) *Attorney, Agent, or Firm* — Oblon, McClelland, Maier & Neustadt, L.L.P.

(57) ABSTRACT

A torque transfer control mechanism that suppresses output-side displacement, and including a rotation control unit that maintains a locked state when an input torque rotating a transfer mechanism is not applied, and releases the locked state when the transfer mechanism rotates. The rotation control unit includes an internal gear and lock plates that include outer teeth that can engage with inner teeth of the internal gear. When an input torque is not applied, the inner teeth of the internal gear engage with the outer teeth of the lock plates, and when the transfer mechanism is rotated, engagement between the inner teeth and the outer teeth is released. Thus, even when torque is applied from the output (Continued)

unit side, engagement between the inner teeth and the outer teeth is not released by the torque.

6 Claims, 10 Drawing Sheets

(51) Int. Cl.
    *G05G 5/24*     (2006.01)
    *F16H 31/00*     (2006.01)
    *B60N 2/90*     (2018.01)
    *B60N 2/16*     (2006.01)

(52) U.S. Cl.
    CPC ............ *B60N 2/224* (2013.01); *B60N 2/933* (2018.02); *B60N 2/943* (2018.02); *F16H 31/002* (2013.01); *G05G 5/18* (2013.01); *G05G 5/24* (2013.01)

(58) Field of Classification Search
    CPC ...... B60N 2/224; B60N 2/235; B60N 2/2356; B60N 2/2362; B60N 2/4445; B60N 2/933; B60N 2/938; B60N 2/943; F16H 31/002; F16H 31/003; F16H 31/004; F16H 31/006; A47C 1/02; F16D 41/088; G05G 5/18; G05G 5/24
    See application file for complete search history.

(56) References Cited

U.S. PATENT DOCUMENTS

| | | | |
|---|---|---|---|
| 8,128,170 B2 * | 3/2012 | Cha ...................... | B60N 2/2362 297/367 P |
| 8,376,464 B2 * | 2/2013 | Heo ...................... | B60N 2/2362 297/367 R |
| 9,296,315 B2 * | 3/2016 | Hellrung ............... | B60N 2/2356 |
| 9,889,774 B2 * | 2/2018 | Espinosa .............. | B60N 2/2227 |
| 2008/0303331 A1 * | 12/2008 | Heo ...................... | B60N 2/2362 297/362 |
| 2011/0089743 A1 * | 4/2011 | Reubeuze ............ | B60N 2/2362 297/463.1 |
| 2014/0077559 A1 * | 3/2014 | Higashi ................. | B60N 2/235 297/354.1 |
| 2014/0225409 A1 | 8/2014 | Nagura et al. | |
| 2014/0284989 A1 | 9/2014 | Nagura et al. | |
| 2017/0361736 A1 * | 12/2017 | Chang .................. | B60N 2/2227 |
| 2018/0056819 A1 * | 3/2018 | Schmitz ............... | B60N 2/2356 |

FOREIGN PATENT DOCUMENTS

| | | |
|---|---|---|
| JP | 2005-209158 A | 8/2005 |
| JP | 2007-118695 A | 5/2007 |
| JP | 2013-147155 A | 8/2013 |
| JP | 2013-154658 A | 8/2013 |

OTHER PUBLICATIONS

International Search Report dated Nov. 2, 2015, in PCT/JP2015/073643 filed Aug. 24, 2015.

* cited by examiner

TORQUE TRANSFER CONTROL MECHANISM AND SEAT STRUCTURE

TECHNICAL FIELD

The present invention relates to a torque transfer control mechanism and a seat structure including the torque transfer control mechanism.

BACKGROUND ART

For example, as disclosed in Patent Document 1, as a lifter mechanism of a seat structure, a mechanism in which, when a transfer mechanism (in Patent Document 1, a mechanism configured by including an operation lever, a lever base, a lock base, a locked member, and an operation shaft) rotates from a neutral position by input torque, an output unit rotates to rotate a pinion and a sector gear connected to the output unit and lift a seat cushion, is known.

In Patent Document 1, in between the transfer mechanism and the output unit, a brake drum for transfer controlling the input torque to the output unit is interposed. The brake drum has an outer cylinder and an inner cylinder (in Patent Document 1, the inner cylinder is commonly used as the output unit connected to the pinion). In between the outer cylinder and the inner cylinder, a pair of two brake springs is installed. The inner cylinder is connected to the operation shaft composing the transfer mechanism. Each end portion of each brake spring is engaged to the inner cylinder and the pinion. When the operation shaft rotates in any direction by the input torque added to the operation lever and accordingly, the inner cylinder rotates in any direction, each brake spring acts in a reduced diameter direction to enable the inner cylinder to rotate, and transfer the force to the pinion. On the other hand, when a force that rotates the inner cylinder is imparted from the pinion or the like that is an output side, each brake spring acts in an increased diameter direction to disable the inner cylinder to rotate by contacting to an inner circumferential surface of the outer cylinder. Thereby, the operation shaft is prevented from rotating due to a load of the seat cushion side, and the seat cushion that is adjusted to a predetermined height by operation of the operation lever can maintain its position.

PRIOR ART DOCUMENT

Patent Document

Patent Document 1: Japanese Patent Application Publication No. 2007-118695

SUMMARY OF THE INVENTION

Problem to be Solved by the Invention

The torque transfer control mechanism used in the lifter mechanism of Patent Document 1 uses the brake spring as described above and only counteracts to an input from the seat cushion side (output side) by the friction force of the brake spring. Therefore, when a load input is repeated from the seat cushion side by vibration during the travel or the like, the inner cylinder rotates even a little counteracting to the friction force by the brake spring and the seat cushion may be deteriorated gradually.

The present invention has been made in consideration of the above, and has a problem of providing a torque transfer control mechanism capable of preventing displacement of an output side of a seat cushion or the like more reliably than conventional mechanisms even when input is performed from the output side due to vibration during the travel or the like, and a seat structure including the torque transfer control mechanism.

Means for Solving the Problem

In order to solve the problem, the torque transfer control mechanism of the present invention is continuously installed with: a transfer mechanism that rotates in a range of a predetermined angle from a neutral position by application of an input torque, and returns to the neutral position by a return spring when the input torque is not applied; and a rotation control unit that becomes a locked state when the input torque rotating the transfer mechanism is not applied and becomes a lock-released state when the transfer mechanism rotates by the input torque, and transfers the torque to the output unit during the lock-released state. In the torque transfer control mechanism, the transfer mechanism is imparted with the input torque to rotate the output unit. The rotation control unit has: an internal gear formed with inner teeth in an inner circumference; a plurality of lock plates installed in a range of the inner circumference of the internal gear, and formed with outer teeth in an outer circumferential surface that engage with the inner teeth of the internal gear in the locked state, and release engagement with the inner teeth in the lock-released state; and a rotation plate including a contact surface that guides each of the lock plates radially outward. An angle between the contact surface with the lock plates in the rotation plate and a contact surface with the outer teeth of the lock plates in the inner teeth of the internal gear is set smaller than a friction angle. Thus, in the locked state, even when the rotation plate attempts to rotate by the torque applied from the output unit, engagement between the outer teeth of the lock plates and the inner teeth of the internal gear is not released.

The torque transfer control mechanism preferably has the following configuration. The rotation plate is formed to be a substantially rhombus shape. An inclined side surface of the rhombus shape is a contact surface with the lock plates. A spring member that energizes the lock plates in a direction of approaching to the inclined side surface of the rotation plate is installed. By the lock plates being energized in the direction of approaching to the inclined side surface of the rotation plate by the spring member, the lock plates are pushed out radially outward along the inclined side surface of the rotation plate, and are energized in a direction engaging with the inner teeth of the internal gear. An elastic force of the spring member reduces backlash between components including the internal gear, the lock plates, and the rotation plate.

The torque transfer control mechanism preferably has the following configuration. The plurality of lock plates are installed in correspondence with each of the inclined side surfaces of the rotation plate that has a substantially rhombus shape. The mechanism has a first engaged portion that engages with engaging portions provided in each of the plurality of lock plates and a second engaged portion that engages with an engaging portion provided in the rotation plate. An input plate that rotates by the input torque is further included. When the input plate rotates, among the lock plates engaged via the first engaged portion, the lock plates of one pair of two related to one set that face each other diagonally and are towed in the rotation direction according to the rotation of the input plate rotate in the same direction to release engagement between the outer teeth of each of the lock plates and the inner teeth of the internal gear. By the input plate further rotating in the same direction, the rotation plate engaged via the second engaged portion rotates to generate a gap instantly in a space with the inclined side surface of the rotation plate. By the elastic force of the spring member, engagement between the outer teeth of the lock plates of one pair of two related to the other set that face each other diagonally and the inner teeth of the internal gear is released and the lock-released state is established. When, by rotation of the rotation plate, the output unit connected to the rotation plate rotates and application of the input torque is lost, by the elastic force of the spring member, each of the lock plates is energized in the direction of approaching to the inclined side surface of the rotation plate, and is pushed out along the inclined side surface of the rotation plate, and the outer teeth of each of the lock plates engage with the inner teeth of the internal gear and the locked state is established.

The spring member is preferably provided in correspondence with each set so that bottom portions are adjacent to each other in the circumference direction and so as to energize a set of two lock plates that slide in the same direction along each inclined side surface of the rotation plate, in the direction of approaching to each inclined side surface.

Other spring member that energizes the rotation control unit and the output unit in a separating direction is preferably further provided between the rotation control unit and the output unit.

The transfer mechanism is preferably configured to include a manual operation unit or an electric operation mechanism and be applied with the input torque manually or electrically.

The torque transfer control mechanism of the present invention is preferably used by being incorporated in a lifter mechanism of a seat structure, a reclining mechanism, or a lumbar control mechanism.

The seat structure of the present invention is characterized by including a lifter mechanism, a reclining mechanism, or a lumbar control mechanism incorporated with the torque transfer control mechanism.

Effect of the Invention

According to the present invention, a rotation control unit is included that maintains a locked state when the input torque that rotates the transfer mechanism is not applied and becomes a lock-released state when the transfer mechanism rotates by the input torque. The rotation control unit is configured to have the internal gear and the lock plates including the outer teeth that can engage with the inner teeth of the internal gear. When the input torque that rotates the transfer mechanism is not applied, the rotation control unit becomes a state where the inner teeth of the internal gear and the outer teeth of the lock plates engage with each other. When the transfer mechanism is rotated, the engagement is released. That is, it is locked by engagement between teeth of gears and only when the torque is applied to the transfer mechanism, this engagement between the teeth is released. Therefore, even when the torque is applied from the output unit side, depending on the torque, engagement between the inner teeth of the internal gear and the outer teeth of the lock plates is not released, and a mechanism connected to the output unit by the torque applied to the output unit is prevented from being displaced gradually, more reliably than conventional ones. Accordingly, for example, when it is used in a lifter mechanism of a seat structure of a vehicle or the like, even when the torque is applied to the output unit from the seat cushion side by vibration during the travel or the like, the seat cushion is not deteriorated gradually.

In addition, a configuration is preferable in which the lock plates are installed between the inclined side surface in the rotation plate having the substantially rhombus shape and the inner teeth of the internal gear, and a spring member that energizes the lock plates in a direction of approaching to the inclined side surface of the rotation plate is provided. The lock plates are energized to be pushed out in a direction of approaching to the inclined side surface of the rotation plate and engaging with the inner teeth of the internal gear along the inclined side surface. Thus, backlash between components including the internal gear, the lock plates, and the rotation plate is reduced by the elastic force of this spring member. Therefore, when the lock plates are incorporated as a lifter mechanism in a seat structure of a vehicle or the like, an abnormal sound generated due to backlash by being affected by vibration or the like during the travel can be prevented.

DESCRIPTION OF THE EMBODIMENTS

Figure 1:
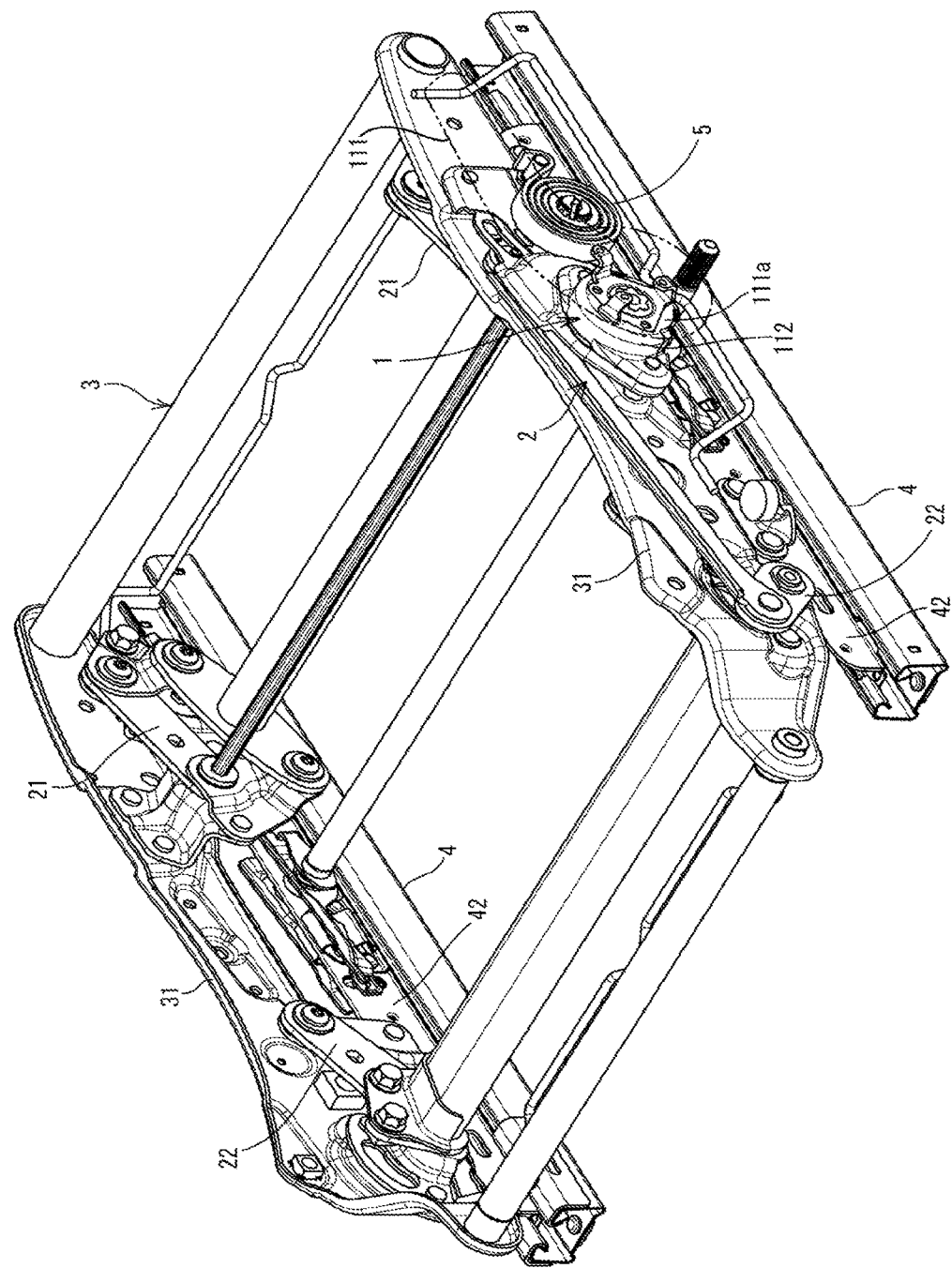
FIG. 1 is a perspective view showing a cushion frame having a lifter mechanism incorporated with a torque transfer control mechanism according to an embodiment of the present invention, viewed from the rear.

Following further describes the present invention in detail on the basis of the embodiments shown in the drawings.

FIG. 1 shows a cushion frame 3 having a lifter mechanism 2 incorporated with a torque transfer control mechanism 1 according to an embodiment of the present invention. The cushion frame 3 is supported by upper rails 42, 42 of a pair of sliders 4, 4. The lifter mechanism 2 has front links 21, 21 and back links 22, 22 arranged between the upper rails 42, 42 and side frames 31, 31 composing the cushion frame 3, and has a spiral spring 5 that energizes the cushion frame 3 (side frames 31, 31) upward with respect to the upper rails 42, 42. In addition to these, the lifter mechanism is configured by including the torque transfer control mechanism 1 according to the present embodiment.

Figure 2:
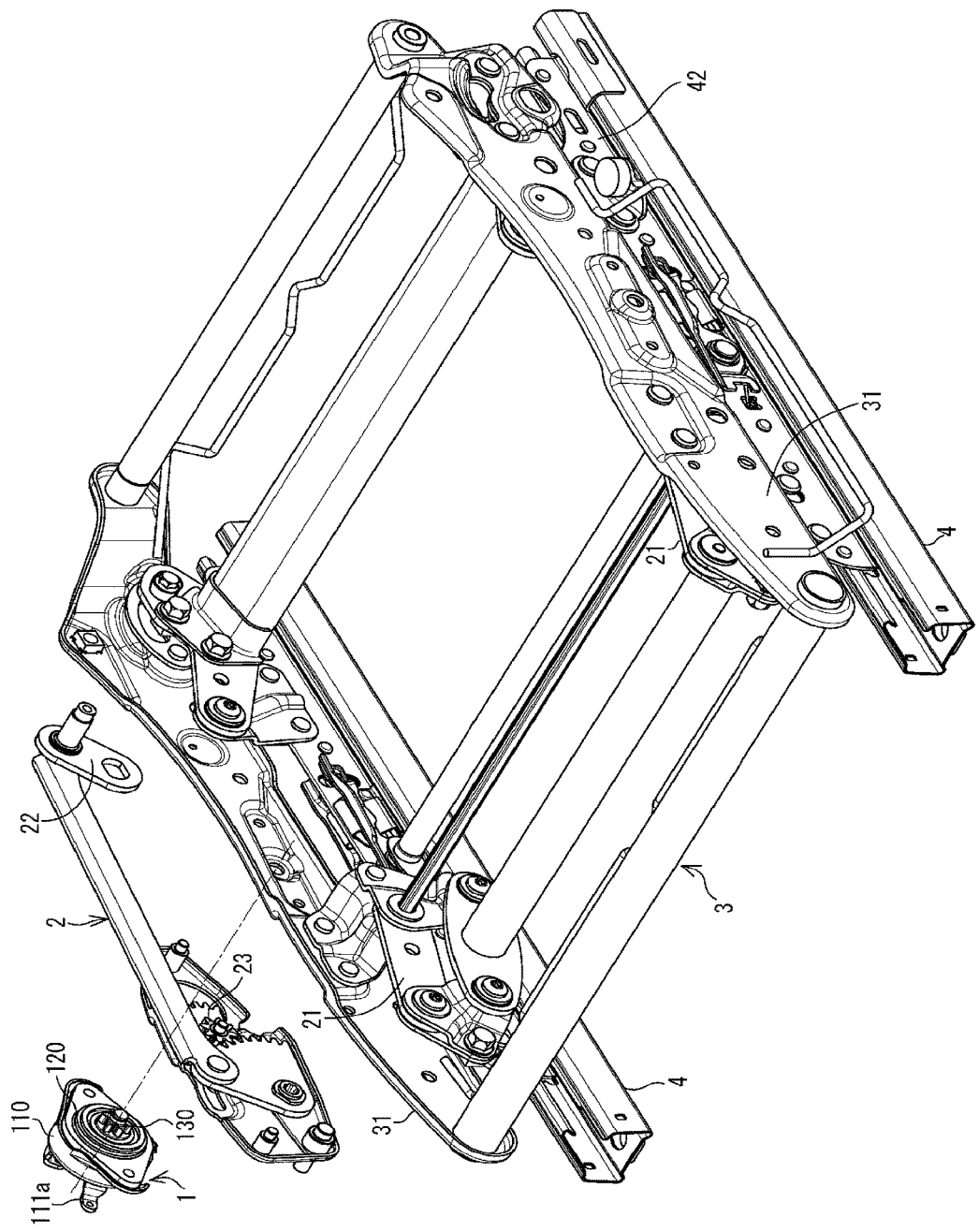
FIG. 2 is an exploded perspective view showing the torque transfer control mechanism, the lifter mechanism, and the cushion frame viewed from the front side.
Figure 3:
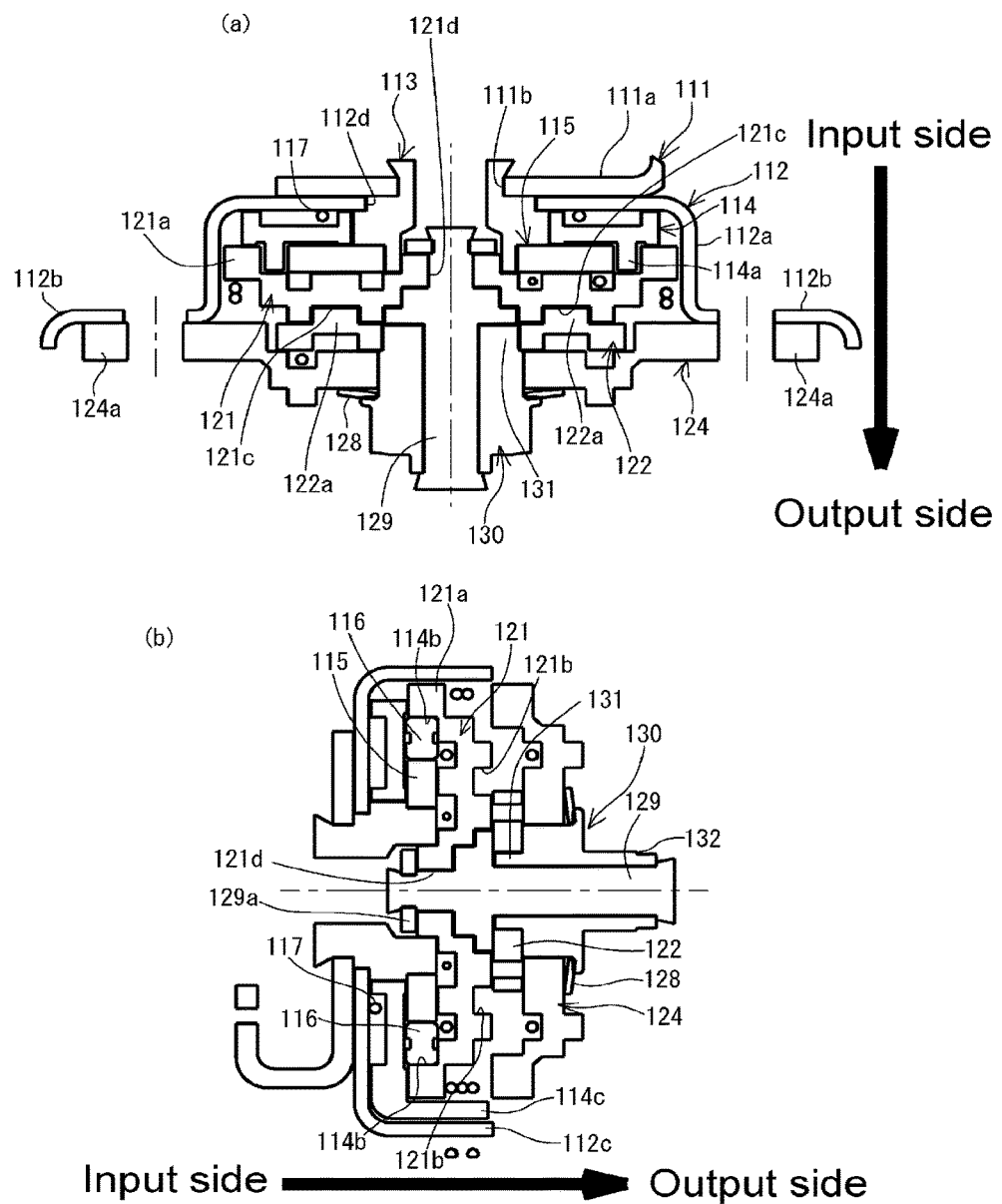
FIG. 3(a) is a plane sectional view of the torque transfer control mechanism.
FIG. 3(b) is a longitudinal sectional view of the torque transfer control mechanism.
Figure 4:
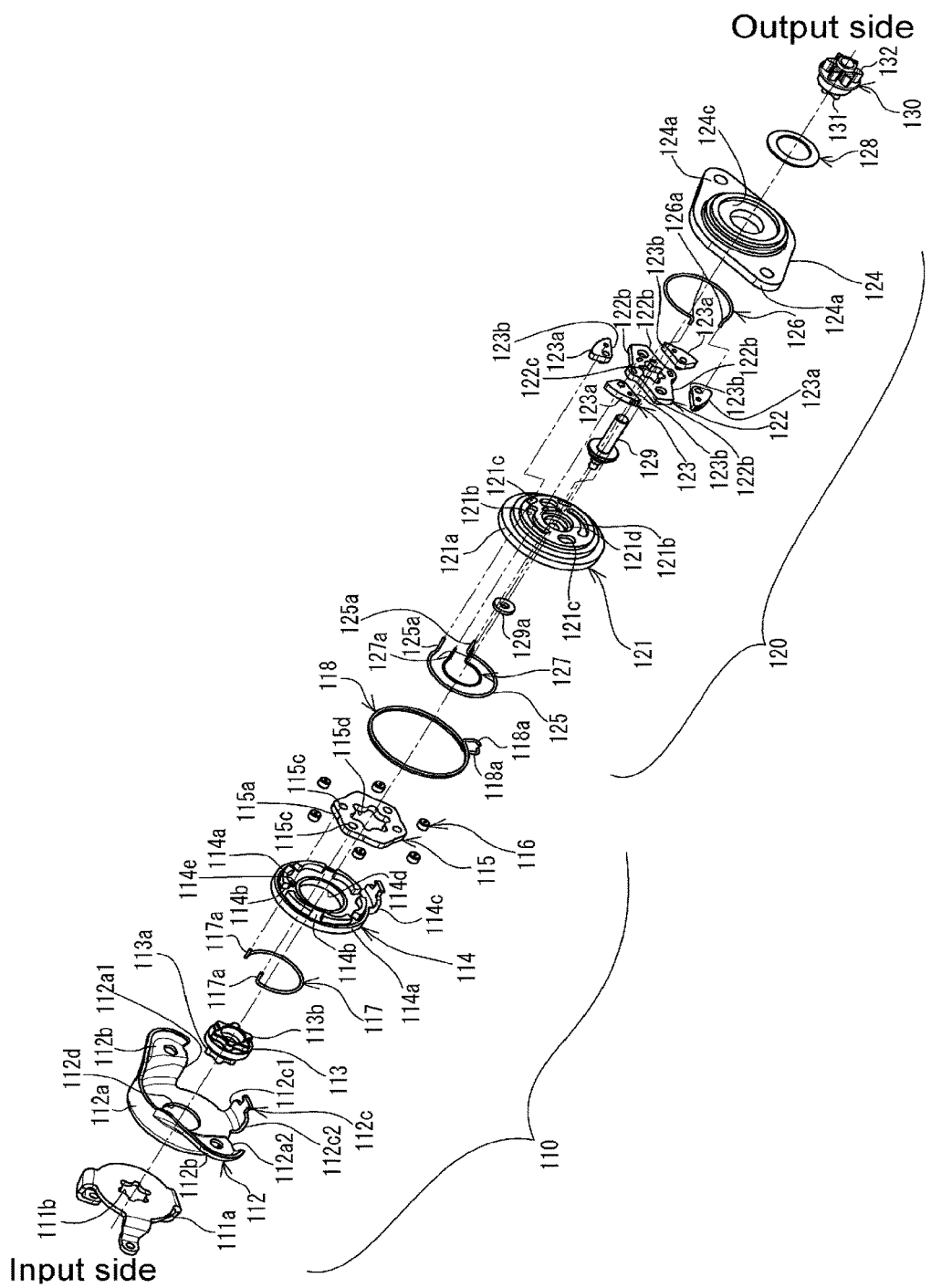
FIG. 4 is an exploded perspective view of the torque transfer control mechanism.

As shown in FIG. 2 to FIG. 4, the torque transfer control mechanism 1 is configured by having a transfer mechanism 110, a rotation control unit 120, and an output unit 130. When an input torque that rotates the transfer mechanism 110 is imparted, the rotation control unit 120 becomes a lock-released state in which the torque is transferred, and the output unit 130 rotates via the rotation control unit 120. When the force to impart the input torque is lost, the rotation control unit 120 becomes the locked state. When the rotation control unit 120 is in the locked state, even when a torque is applied to the output unit 130, the locked state is not released by the torque. The torque transfer control mechanism 1 is such mechanism. Following further describes its configuration in detail.

The transfer mechanism 110 is configured by having a lever 111, a cover member 112, a shaft 113, a retainer 114, a cam 115, rollers 116, a first spring 117, a second spring 118, and the like. The lever 111 has a predetermined length as shown in an imaginary line in FIG. 1. A base part 111a of the lever 111 is provided rotatably in an outer surface side of the cover member 112. The base part 111a can rotate both of forward and reverse directions with respect to the cover member 112 and rotates by the input torque being imparted to either forward or reverse direction. In an inner circumferential side of the cover member 112, the shaft 113 is installed. One end portion 113a of the shaft 113 fits to a fitting hole 111b provided in the base part 111a of the lever 111 via a through hole 112d provided in the cover member 112. When the lever 111 is rotated, accordingly, the shaft 113 rotates together. In the present embodiment, the lever 111 is a manual operation unit operated manually. However, a motor (not shown) can be connected to the base part 111a instead of the manual lever 111 and the lever 111 can be an electrical operation mechanism in which the base part 111a rotates in forward and reverse directions electrically.

The cover member 112 has a cylindrical part 112a, and attachment pieces 112b, 112b that protrude right and left of the cylindrical part 112a. The attachment pieces 112b, 112b are attached along with an internal gear 124 of the rotation control unit 120 described later to an outer surface of one side frame 31 composing the cushion frame 3 by using a spring. A substantially half of a lower side of a circumferential surface of the cylindrical part 112a of the cover member 112 is cut out other than a cover protruding piece 112c that protrudes inward (a direction in which the rotation control unit 120 is arranged, and that is opposite direction from the lever 111 side) in a substantially center portion of the cylindrical part 112a. Rotation ranges of the lever 111 at a time of forward and reverse rotation are between one end edge 112c1 of the cover protruding piece 112c and one cutout end surface 112a1 of the cylindrical part 112a and between the other end edge 112c2 of the cover protruding piece 112c and the other cutout end surface 112a2 of the cylindrical part 112a.

In the cylindrical part 112a of the cover member 112, the retainer 114 is further installed. The retainer 114 is formed in a substantially disk shape. In an inner surface (opposite surface from the base part 111a side of the lever 111 contacting with the cover member 112), a partition wall part 114a is erected along a circumferential direction. The partition wall part 114a is cut out for every predetermined length in a circumferential direction and the cutout portion is a roller arrangement groove 114b. The roller arrangement groove 114b is formed in six with equal intervals in the present embodiment. However, the number of formation is not limited to that. The retainer 114 is formed with one retainer protruding piece 114c that protrudes inward similarly to the cover protruding piece 112c, from a circumferential surface of the retainer 114.

Figure 5:
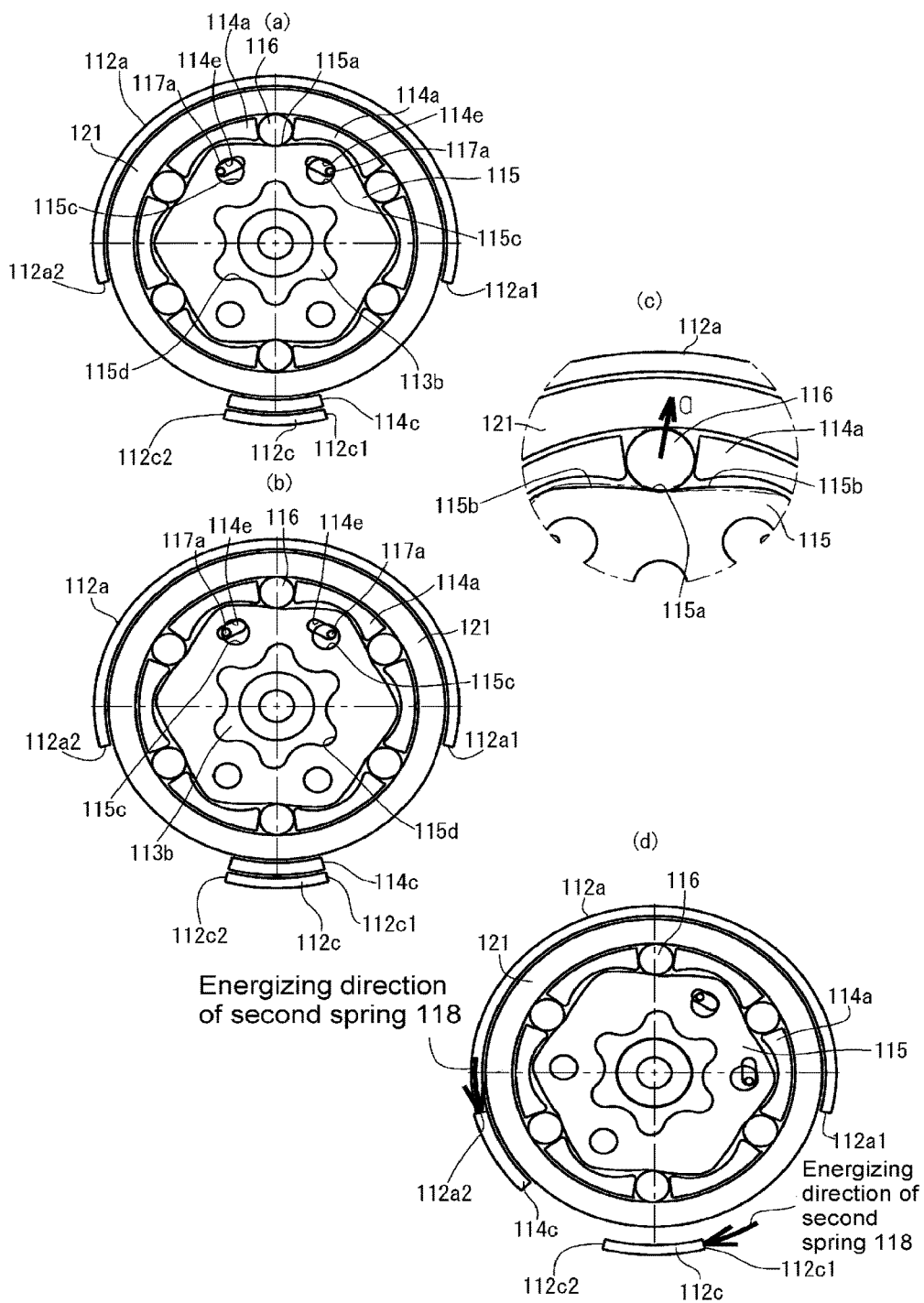
FIGS. 5(a) to (d) are diagrams for explaining an action of a transfer mechanism in the torque transfer control mechanism.

In a range of an inner circumference of the partition wall part 114a of the retainer 114, the cam 115 is installed. In the roller arrangement groove 114b, the rollers 116 are arranged. As shown in FIG. 4 and FIG. 5, the cam 115 is formed by a substantially hexagon plate-shape body. Each side of the cam 115 is formed to be a substantially valley-shape in which a substantially center part 115a recesses toward a center direction of the cam 115. In a neutral position shown in FIG. 5(a), the substantially center part 115a of each side of the cam 115 is set in a position so that the rollers 116 arranged in each roller arrangement groove 114b of the retainer 114 face each other. Accordingly, when the cam 115 attempts to rotate in either forward or reverse direction from this position, as shown in FIG. 5(b) and FIG. 5(c), any of inclined side parts 115b holding the substantially center part 115a therebetween pushes the rollers 116 radially outward (arrow a direction shown in FIG. 5(c)).

The retainer 114 is supported by the first spring 117. While the first spring 117 is formed to be a substantially circle shape, the first spring 117 is bent at substantially 90 degrees so as to protrude in the same direction, before the end portions 117a, 117a overlap each other. In the retainer 114, through holes 114e, 114e are formed with a narrower interval than an interval between the end portions 117a, 117a of the first spring 117. In correspondence with the through holes 114e, 114e, spring engagement holes 115c, 115c to which each of end portions 117a, 117a of the first spring 117 are inserted, are formed in the cam 115. Accordingly, when each of the end portions 117a, 117a is engaged with the spring engagement holes 115c, 115c, of the cam 115 via the through holes 114e, 114e, in a state where the first spring 117 is located at the outer surface side of the retainer 114, the first spring 117 is engaged with its diameter reduced, and thereby elasticity always acts in the increased diameter direction. Due to the elastic force, the cam 115 in the partition wall part 114a of the retainer 114 is maintained in the neutral position described above (position in FIG. 5(a)).

In the retainer 114, a circular central hole 114d having a predetermined diameter is formed by penetrating. In correspondence with the central hole 114d, a fitting hole 115d that fits to the other end portion 113b of the shaft 113 is formed in the center of the cam 115. Thereby, when the shaft 113 rotates in either forward or reverse direction by the lever 111, the cam 115 rotates in either forward or reverse direction and pushes the rollers 116 radially outward as described above (see FIGS. 5(b), (c)). When the input of the input torque that rotates the lever 111 and the shaft 113 is lost, a relative position of the cam 115 with respect to the retainer 114 is made return to the neutral position (position in FIG. 5(a)) by the elastic force of the first spring 117.

As shown in FIG. 5(a), the retainer protruding piece 114c of the retainer 114 and the cover protruding piece 112c of the cover member 112 are set so that a position where they overlap each other is a neutral position. When the rollers 116 are pushed radially outward as shown in FIGS. 5(b) and (c) with respect to the cover member 112 fixedly arranged, and the retainer 114 starts to rotate along with an input plate 121 described later, the retainer protruding piece 114c separates from the cover protruding piece 112c in a circumferential direction as shown in FIG. 5(d). The second spring 118 is installed to make the retainer protruding piece 114c return to the neutral position where the retainer protruding piece 114c overlaps the cover protruding piece 112c. The second spring 118 is formed to be a spiral shape and is formed by each end portions 118*a*, 118*a* being bent outward in the circumferential direction. Each end portions 118*a*, 118*a* of the second spring 118 is crossed in the circumferential direction and is engaged to the retainer protruding piece 114*c* and the cover protruding piece 112*c* that are aligned to overlap each other.

Thereby, when the position of the retainer protruding piece 114*c* with respect to the cover protruding piece 112*c* attempts to deviate slightly in the circumferential direction, the second spring 118 attempts to reduce its diameter, and thereby an elastic force to return the position in a direction of the neutral position acts (see FIG. 5(*d*)). Since the elastic force of the second spring 118 is applied, when the cam 115 attempts to rotate according to the rotation of the shaft 113, the cam 115 slightly rotates independently from the retainer 114, then the roller 116 is pushed radially outward as described above, and pushes an end wall of each roller arrangement groove 114*b* in the partition wall part 114*a* to rotate the retainer 114. That is, when the cam 115 rotates, since the relative position with the retainer 114 is deviated from the neutral position, when imparting of the input torque is lost, the first spring 117 returns the relative position to the neutral position.

Figure 6:
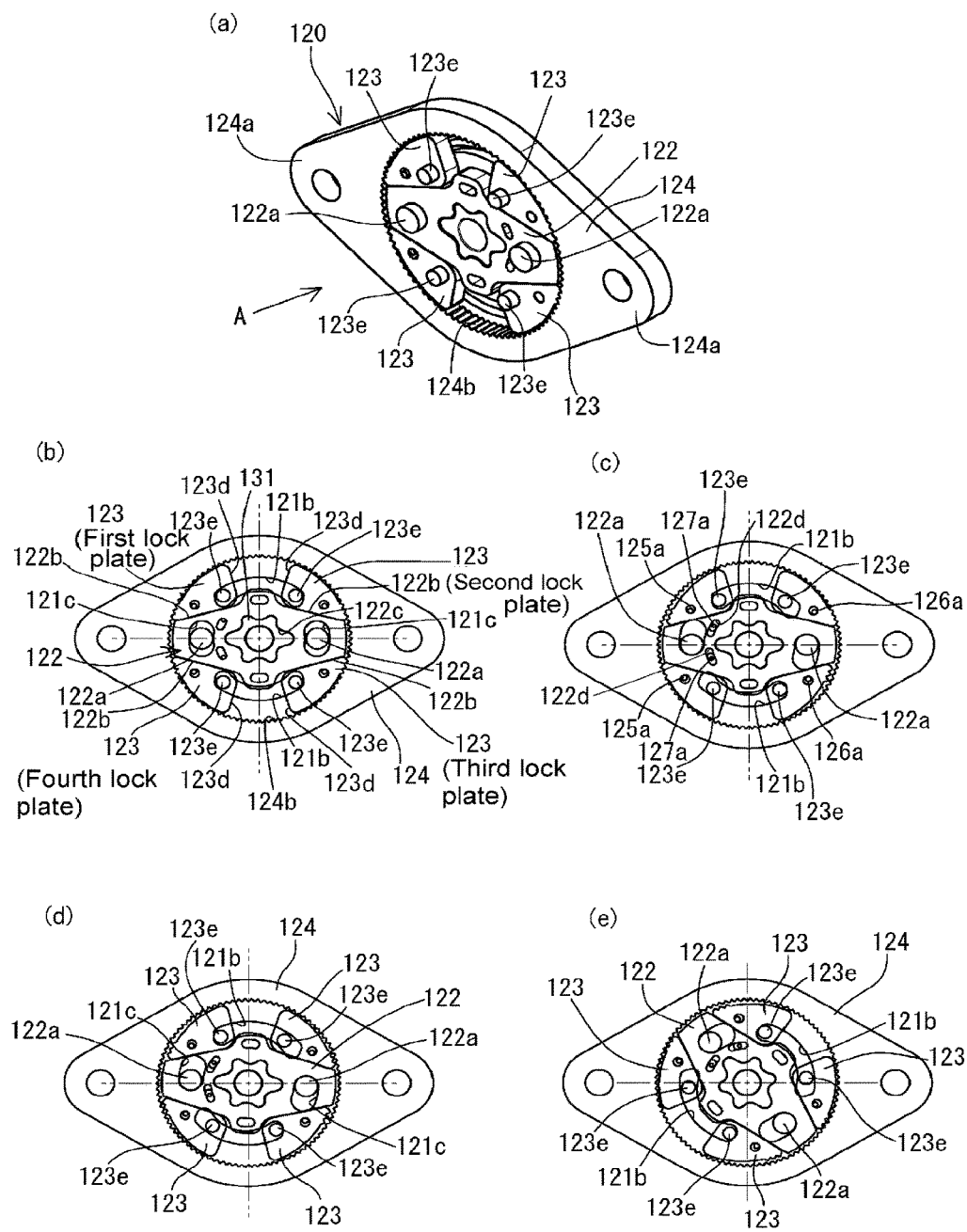
FIGS. 6(a) to (e) are diagrams for explaining an action of a rotation control unit in the torque transfer control mechanism.

Next, the rotation control unit 120 will be described. As shown in FIG. 3, FIG. 4, and FIG. 6, the rotation control unit 120 is configured by having an input plate 121, a rotation plate 122, lock plates 123, an internal gear 124, a third spring 125, a fourth spring 126, a fifth spring 127, and a sixth spring 128. The rotation control nit 120 is provided adjacent to the transfer mechanism 110 on the same shaft having the same rotation center as the transfer mechanism 110.

The input plate 121 has a predetermined thickness. A surface side of the input plate 121 that is adjacent to the retainer 114 and the cam 115 is formed with a peripheral wall part 121*a*. In a circular recess part surrounded by the peripheral wall part 121*a*, the partition wall part 114*a* and the rollers 116 of the retainer 114 are accommodated (see FIG. 3). The inner diameter of the peripheral wall part 121*a* is formed to be slightly larger than the outer diameter of the partition wall part 114*a* of the retainer 114. The input plate 121 is installed so that the peripheral wall part 121*a* is located at the periphery of the partition wall part 114*a* of the retainer 114. Thus, in the transfer mechanism 110, when the cam 115 rotates in any direction and the roller 116 is pushed radially outward, the roller 116 is pushed to the inner circumferential surface of the peripheral wall part 121*a* (see FIGS. 5(*b*) and (*c*)). As a result, when the cam 115 rotates, the input plate 121 starts to rotate along with the retainer 114.

In the present embodiment, the input plate 121 is classified as being included in the rotation control unit 120. However, rotation control is performed by that the input plate 121 starts to rotate, and first engaged portions 121*b*, 121*b* and second engaged portions 121*c*, 121*c* formed in the input plate 121 perform a predetermined function as described later. Therefore, the input plate 121 may be classified as being included in the transfer mechanism 110. The other components including the first engaged portions 121*b*, 121*b* and the second engaged portions 121*b*, 121*c* may be regarded as the rotation control unit 120 by regarding the components up to the peripheral wall part 121*a* as the transfer mechanism 110, functionally. In any way, which of the transfer mechanism 110 or the rotation control unit 120 is regarded to include the input plate 121 does not affect interpretation of claims at all.

The input plate 121 includes two first engaged portions 121*b*, 121*b*, and two second engaged portions 121*c*, 121*c*, that are opened in the opposite surface from the surface formed with the peripheral wall part 121*a* that is adjacent to the retainer 114. The first engaged portions 121*b*, 121*b* and the second engaged portions 121*c*, 121*c* may be groove shapes and may be hole shapes extending through the input plate 120 in the thickness direction. Also, a center hole 121*d* is provided in which a shaft member 129 for centering is inserted, in the center. The component applied with the reference numeral 129*a* is a detachment prevention ring of the shaft member 129 (see FIG. 3 and FIG. 4).

As shown in FIG. 3(*b*), FIG. 4, and FIG. 6(*b*) to (*e*), the first engaged portions 121*b*, 121*b* are formed to be arc shapes having a predetermined length in the circumferential direction, in symmetry by holding the center hole 121*d* therebetween. FIGS. 6(*b*) to (*e*) are plan views viewed from an arrow A direction in FIG. 6(*a*). Thus, the input plate 121 not drawn in FIG. 6(*a*) is not shown. However, for convenience of description, in the input plate 121, the shapes of the first engaged portions 121*b*, 121*b* and the second engaged portions 121*c*, 121*c* and relative positions are shown together. In the present embodiment, four lock plates 123 are provided (hereinafter, in some cases, the lock plate 123 arranged in the upper left in FIG. 6(*b*) refers to a first lock plate, the lock plate 123 arranged in the upper right refers to a second lock plate, the lock plate 123 arranged in the lower right refers to a third lock plate, and the lock plate 123 arranged in the lower left refers to a fourth lock plate). Engaging portions (lock plate engaging portions) 123*e* provided in the four lock plates 123 engage with the first engaged portions 121*b*, 121*b*. In the present embodiment, among the four lock plate engaging portions 123*e*, two lock plate engaging portions 123*e*, 123*e* of two lock plates 123, 123 of which outside surface parts 123*d*, 123*d* are adjacent to each other in the circumferential direction (a set of the first lock plate 123 and the second lock plate 123, and a set of the third lock plate 123 and the fourth lock plate 123) are provided so as to each engage with one of the first engaged portions 121*b*. However, the first engaged portions 121*b* may be shorter in the circumferential direction than that shown in FIGS. 6(*b*) to (*d*), may be formed in four in symmetrical positions, and may be configured so that each one of the first engaged portions 121*b* engages to each of four lock plate engaging portions 123*e*. Relationship between the first engaged portions 121*b* and the lock plate engaging portions 123*e* will be further described later.

The second engaged portions 121*c*, 121*c* are formed to be an arc shape having a shorter length than the first engaged portions 121*b*, 121*b* in symmetry by holding the center hole 121*d* therebetween, in between adjacent end portions in a circumferential end direction between the first engaged portions 121*b*, 121*b*.

The rotation plate 122 is formed to be a substantially rhombus shape. In one surface of the rotation plate 122, two engaging portions (rotation plate engaging portions) 122*a*, 122*a* are provided in symmetrical positions holding the center therebetween. Two rotation plate engaging portions 122*a*, 122*a* are composed of columnar protrusions, are assembled in a direction in which the columnar protrusions protrude to the input plate 121 side, and are engaged to the second engaged portions 121*c*, 121*c* formed to be an arc shape, respectively. Since the rotation plate 122 is formed to be the substantially rhombus shape, the rotation plate 122 has four inclined side surfaces 122*b*. In the center of the rotation plate 122, a fitting hole 122*c* that is located at one end side of the output unit 130 and fits with a connection shaft part 131 in which a plurality of irregular parts protrude in an outer circumference, is formed by penetrating. Accordingly, when the rotation plate 122 rotates, the output unit 130 rotates.

The rotation plate 122 is installed in an inner circumference range in which the inner teeth 124b of the internal gear 124 are formed. The outer diameter of the rotation plate 122 along a longer diagonal line (line shown by reference sign X in FIG. 6(b)) has a length that is shorter than the inner diameter of the internal gear 124 and does not contact with the inner teeth 124b so that the rotation plate 122 can rotate in any direction. The internal gear 124 includes flange parts 124a, 124a that protrude to both sides. The attachment pieces 112b, 112b of the cover member 112 are stacked to the flange parts 124a, 124a, and the internal gear 124 is attached to an outer surface of one of the side frames 31 composing the cushion frame 3 by using a screw.

Figure 7:
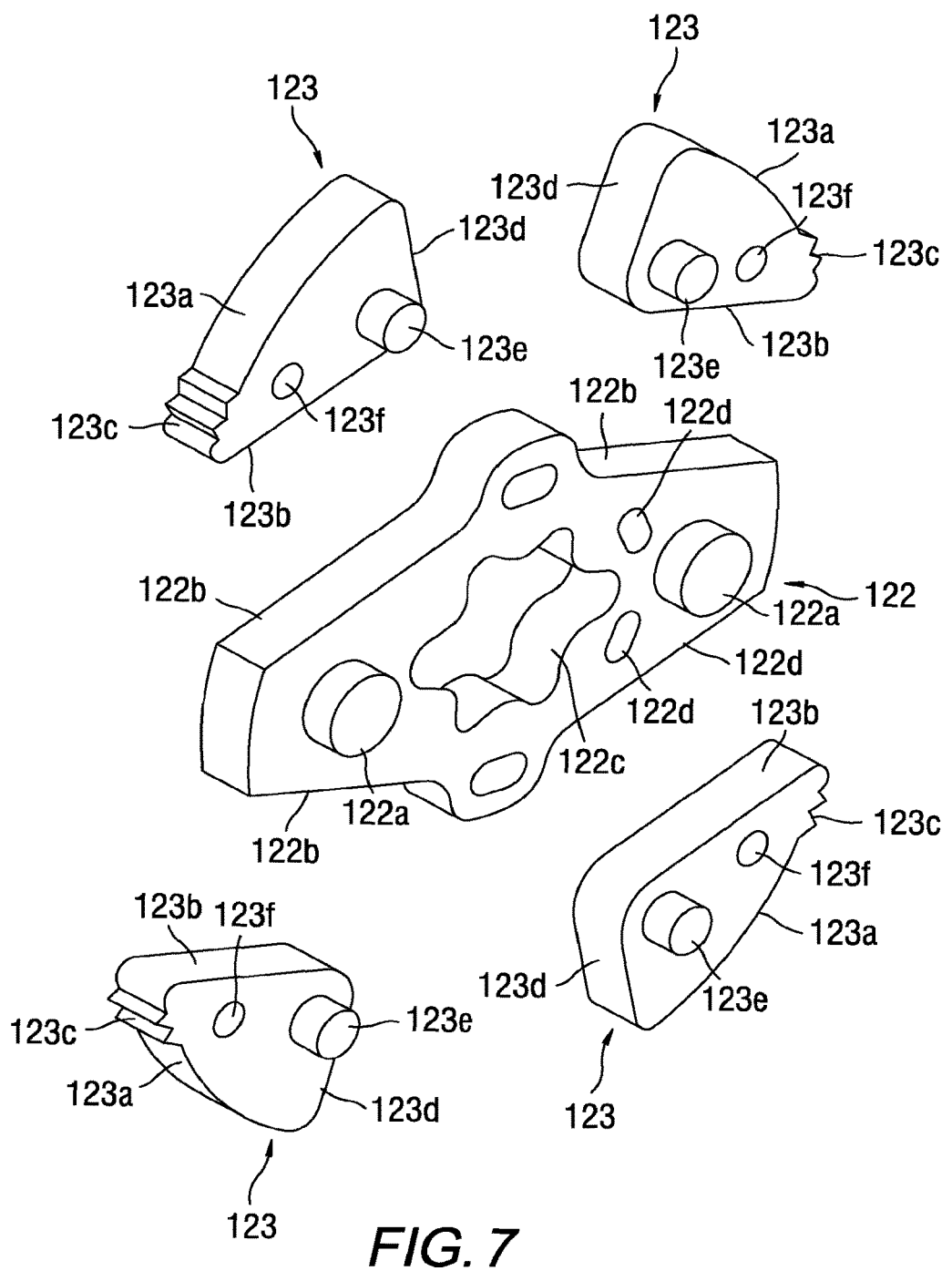
FIG. 7 is an enlarged perspective view of a rotation plate and lock plates.

As shown in FIG. 6, the lock plates 123 are installed in spaces formed between each of four inclined side surfaces 122b of the rotation plate 122 and the inner teeth 124b formed in the inner circumference of the internal gear 124. As shown in FIG. 6 and FIG. 7, the lock plates 123 are formed in a shape that is approximate to a right triangle or a quarter circle in a plan view. A side of the shape corresponding to a hypotenuse of a right triangle is an arc part 123a having an almost same curvature as the inner circumference of the internal gear 124. A bottom surface part 123b of the shape corresponding to a base of a right triangle contacts with each of the inclined side surfaces 122b of the rotation plate 122. That is, the inclined side surface 122b of the rotation plate 122 and the bottom surface part 123b of the lock plates 123 are contact surfaces that contact with each other. Since the rotation plate 122 is the substantially rhombus shape, inclined side surfaces 122b, 122b that are adjacent by holding the longer diagonal line of the rotation plate 122 therebetween incline so that they gradually come close to each other as going from the center to outward. Accordingly, when the lock plates 123, 123 arranged adjacently by holding the longer diagonal line of the rotation plate 122 therebetween are energized in a direction of contacting with the inclined side surfaces 122b, 122b to which the bottom surface parts 123b, 123b correspond, the inclined side surfaces 122b, 122b that are adjacent by holding the longer diagonal line therebetween approach as going outward. Thereby, the lock plates 123, 123 are guided along these inclined side surfaces 122b, 122b and are pushed out radially outward.

In order to achieve this function, in a direction of contacting with the inclined side surfaces 122b, 122b that are adjacent by holding the longer diagonal line therebetween, the third spring 125 and the fourth spring 126 that serve as spring members energizing the bottom surface parts 123b, 123b of the lock plates 123, 123 are installed. Both of the third spring 125 and the fourth spring 126 are formed in a substantially circular shape, while they are bent at substantially 90 degrees so as to protrude in the same direction before end portions 125a, 125a overlap each other and end portions 126a, 126a overlap each other. The third spring 125 inserts the end portions 125a, 125a from a surface located at the retainer 114 side in the input plate 121 via a through hole formed in the input plate 121, and engages the end portions 125a, 125a to spring engagement holes 123f, 123f of the lock plates 123, 123 of one set in which the bottom surface parts 123b, 123b are adjacent to each other in the circumferential direction by holding the longer diagonal line of the rotation plate 122 therebetween (the set of the first lock plate 123 and the fourth lock plate 123). Similarly, the fourth spring 126 is engaged to the spring engagement holes 123f, 123f of the other set of two lock plates 123, 123 (the set of the second lock plate 123 and the third lock plate 123) from the opposite surface side of the lock plates 123, 123 by the end portions 126a, 126a.

Both of the third spring 125 and the fourth spring 126 are provided so that each of the lock plates 123, 123 in one set of a pair of two (each of the first lock plate 123 and the fourth lock plate 123) and each of the lock plates 123, 123 in the other set (each of the second lock plate 123 and the third lock plate 123) in which the bottom surface parts 123b, 123b are adjacent to each other in the circumferential direction by holding the longer diagonal line of the rotation plate 122 therebetween are energized in a direction of approaching. By the third spring 125 and the fourth spring 126, the bottom surface parts 123b, 123b of each of the lock plates 123, 123 are always pushed to each of the inclined side surfaces 122b, 122b of the lock plates 122. Thereby, each of the lock plates 123, 123 is energized in a direction of releasing outward along the inclination of each of the inclined side surfaces 122b, 122b (radially outward). By providing the third spring 125 and the fourth spring 126 in this way, backlash between components including the rotation plate 122, the lock plates 123, and the internal gear 124 is reduced by the effect of the elastic force of the third spring 125 and the fourth spring 126. The backlash between components is essential for smooth operation. Whereas, an abnormal sound is generated due to the backlash by effect of vibration or the like, during the travel. However, having the third spring 125 and the fourth spring 126 can secure smooth operation between components by their elasticity, while it can contribute to prevent the abnormal sound from being generated.

In an arc part 123a that is an outer circumferential surface of the lock plates 123, outer teeth 123c that engage with the inner teeth 124 of the internal gear 124 is formed. When the number of teeth of the outer teeth 123c is larger, the internal gear 124 is easy to rotate by the input from the output side. On the other hand, when the number is too small, necessary strength cannot be acquired. Thus, setting is performed with consideration to this. The outer teeth 123c is preferably formed in the vicinity of a corner portion between the arc part 123a and the bottom surface part 123b in order to prevent a pressure angle of the outer teeth 123c from changing due to the rotation of the lock plates 123 by the input from the output side. However, depending on the length of the bottom side part 123b of the lock plates 123, the function of preventing rotation of the lock plates 123 is increased by the outer teeth 123c. Thus, the outer teeth 123c may be formed in, for example, the vicinity of the center of the arc part 123a.

The lock plates 123 are provided with, in one surface, in the vicinity of a corner portion between the bottom surface part 123b and an outside surface side part 123d that erects from the bottom surface part 123b to the arc part 123a, an engaging portion (lock plate engaging portion) 123e composed of a columnar protrusion. The engaging portion 123e is assembled in a direction in which the engaging portion 123e protrudes to the input plate 121 side. The lock plate engaging portion 123e is engaged to the first engaged portions 121b of the input plate 121. As described above, in the present embodiment, each of the lock plate engaging portions 123e, 123e of two lock plates 123, 123 in which the outside surface parts 123d, 123d are adjacent to each other in the circumferential direction (the set of the first lock plate 123 and the second lock plate 123 and the set of the third lock plate 123 and the fourth lock plate 123) is arranged in one of the first engaged portions 121b. Thus, an interval in a circumferential direction of each of the first engaged portions 121*b*, 121*b* is longer than an interval of adjacent two lock plate engaging portions 123*e*, 123*e* in the circumferential direction. Thereby, when the input plate 121 rotates in either forward or reverse direction, the lock plates 123, 123 of a pair of two that face each other diagonally (when it is clockwise, the set of the first lock plate 123 and the third lock plate 123 and when it is counterclockwise, the set of the second lock plate 123 and the fourth lock plate 123) among four lock plates contact with the lock plate engaging portions 123*e*, 123*e*. Thereby, a rear end surface in the rotation direction (as shown in FIG. 8, when the rotation direction by the input torque is clockwise, B surface) in the first engaged portions 121*b*, 121*b* in the first engaged portions 121*b*, 121*b* is towed in the rotation direction of the input plate 121.

Figure 8:
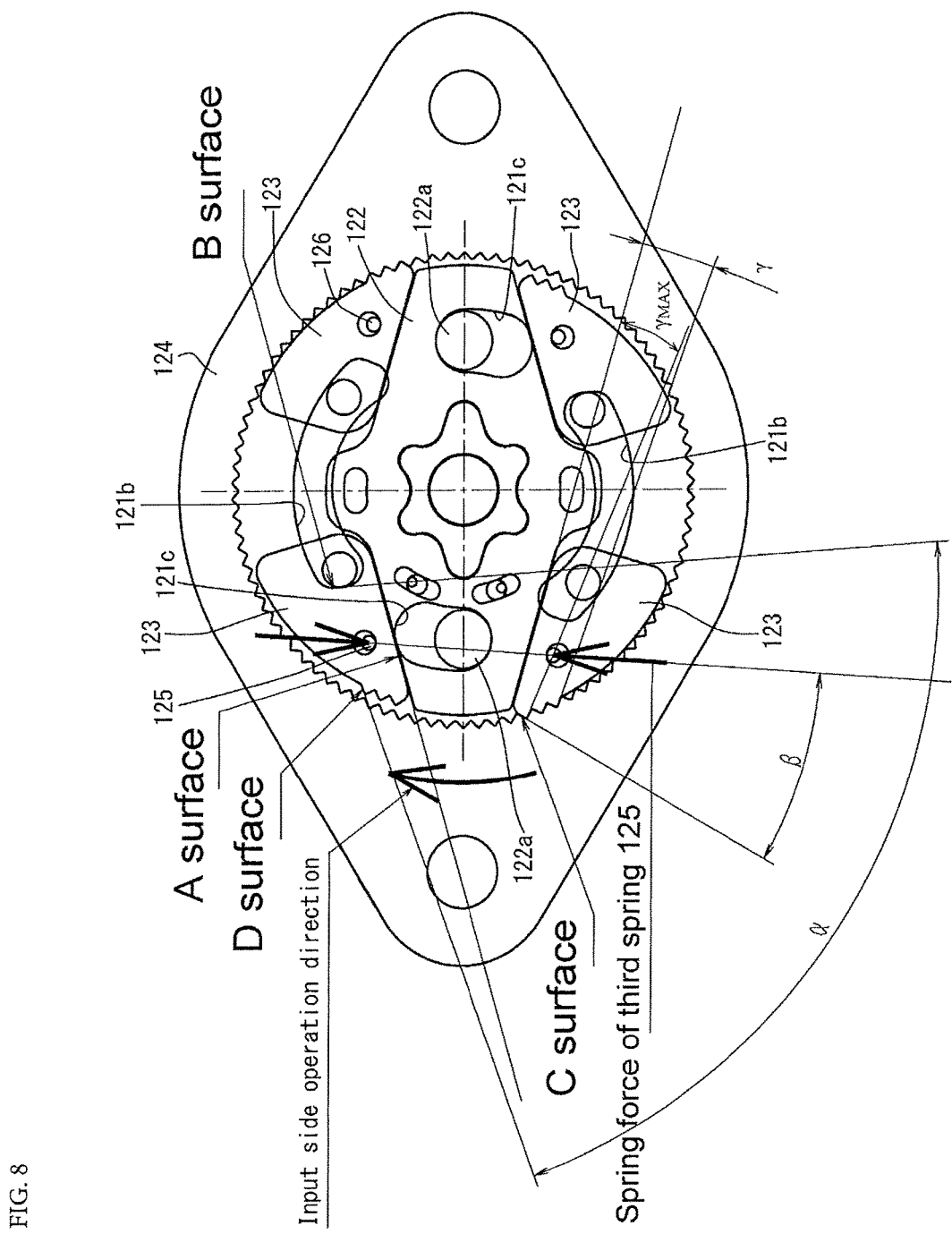
FIG. 8 is a diagram for explaining an action of the rotation control unit in the torque transfer control mechanism.

As shown in FIG. 8, an angle α between the rear end surface in the rotation direction of the first engaged portions 121*b*, 121*b* of the lock plates 123, 123 of one set of a pair of two that face each other diagonally (the B surface (FIG. 8 shows the B surface only for the lock plate 123 (first lock plate 123) of one side among the lock plates 123, 123 of one pair of two (the set of the first lock plate 123 and the third lock plate 123. Only corresponding ones are shown also for A surface, C surface, and D surface below) of when the rotation direction is clockwise) and a surface (D surface) that contacts with the inner teeth 124*b* in the outer teeth 123*c*, 123*c* that are in a front side in the rotation direction of the clockwise in the lock plates 123, 123 of the one set of a pair of two (the set of the first lock plate 123 and the third lock plate 123) is made to be an acute angle. Moreover, the force of being pushed of the bottom surface parts 123*b*, 123*b* of the lock plates 123, 123 to the inclined side surfaces 122*b*, 122*b* (A surface) of the rotation plate 122 by the third spring 125 and the fourth spring 126 is set larger than the friction force generated in the contact surface (B surface) of both of the rear end surface in the rotation direction and the lock plate engaging portions 123*e*, 123*e* by the force of pushing the lock plate engaging portions 123*e*, 123*e* by the rear end surface in the rotation direction (B surface) of the first engaged portions 121*b*, 121*b*. Thereby, when the lock plates 123, 123 of one pair of two that face each other diagonally (the set of the first lock plate 123 and the third lock plate 123) are towed in the rotation direction of the input plate 121 as described above, that is, when the rear end surface in the rotation direction (B surface) of the first engaged portions 121*b*, 121*b* pushes the lock plate engaging portions 123*e*, 123*e*, the bottom surface parts 123*b*, 123*b* of the lock plates 123, 123 (the first lock plate 123 and the third lock plate 123) slide on the inclined side surfaces 122*b*, 122*b* (A surface) of the rotation plate 122. Thus, engagement between the outer teeth 123*c*, 123*c* and the inner teeth 124*b* of the lock plates 123, 123 of the one set of one pair of two that face each other diagonally (the set of the first lock plate 123 and the third lock plate 123) is released.

The third spring 125 and the fourth spring 126 are set so that the spring force is applied to the reduced diameter direction in which the bottom surface parts 123*b*, 123*b* of the lock plates 123, 123 (each of the first lock plate 123 and the fourth lock plate 123, and each of the second lock plate 123 and the third lock plate 123) are pushed to the corresponding inclined side surfaces 122*b*, 122*b* (A surface) in the rotation plate 122. However, an angle β between a line along a direction of action of the spring force and a surface (C surface) that is a front side in the clockwise rotation direction in the lock plates 123, 123 of the other set of a pair of two that face each other diagonally (the second lock plate 123 and the fourth lock plate 123) and fits with the inner teeth 124*b* in the outer teeth 123*c*, 123*c*, is set to be an acute angle. Thereby, when engagement between the outer teeth 123*c*, 123*c* and the inner teeth 124*b* of the lock plates 123, 123 of the one set of a pair of two that face each other diagonally (the first lock plate 123 and the third lock plate 123) is released as described above according to the rotation of the input plate 121, a rear end surface in the rotation direction of the second engaged portions 121*c*, 121*c* of the input plate 121 contacts to the rotation plate engaging portions 122*a*, 122*a* to rotate the rotation plate 122 in the same direction. When the rotation plate 122 rotates, the third spring 125 and the fourth spring 126 attempt to rotate, by the elastic force thereof, the lock plates 123, 123 of the other set of a pair of two that face each other diagonally (the second lock plate 123 and the fourth lock plate 123) in the same direction. At this time, the outer teeth 123*c*, 123*c* of the lock plates 123, 123 of the other set of a pair of two (the second lock plate 123 and the fourth lock plate 123) rotate while sliding on the engaged surface with the inner teeth 124*b* (C surface) and their engagement is released. Thus, the lock-released state is established.

The rotation plate 122 starts to rotate by the rear end surface in the rotation direction of the second engaged portions 121*c*, 121*c* of the input plate 121 contacting to the rotation plate engaging portions 122*a*, 122*a*. Therefore, the relative positions of the input plate 121 and the rotation plate 122 are deviated for the amount of rotation. Thus, it is preferable that the fifth spring 127 is installed that imparts an elastic force to return the relative positions of the input plate 121 and the rotation plate 122 to the neutral position (the rotation plate engaging portions 122*a*, 122*a* to the center of the circumferential direction of the second engaged portions 121*b*, 121*c*) when imparting of the input torque is lost and the rotation of the input plate 121 is stopped. In the present embodiment, while the fifth spring 127 is formed to be a substantially circular shape, the fifth spring 127 is bent at substantially 90 degrees so as to protrude in the same direction before the end portions 127*a*, 127*a* overlap each other. The fifth spring 127 is formed to have a smaller diameter than that of the third spring 125. From a surface located at the retainer 114 side in the input plate 121, the end portions 127*a*, 127*a* are inserted via a through hole formed in the input plate 121. The end portions 127*a*, 127*a* are engaged with the spring engagement holes 122*d*, 122*c* formed in the rotation plate 122. At this time, the fifth spring 127 is reduced in its diameter to engage with the spring engagement holes 122*d*, 122*d* and is installed so that the elastic force acts in the increased diameter direction. Thereby, deviation of the relative positions of the input plate 121 and the rotation plate 122 is released soon after the input torque is lost, and the relative positions return to the neutral position.

On the other hand, an angle γ between the inclined side surfaces 122*b* (A surface) of the rotation plate 122 that is a contact surface of the bottom surface parts 123*b* of each of the lock plates 123 and a surface (D surface) that contacts with the inner teeth 124*b* in the outer teeth 123*c* of each of the lock plates 123, is set smaller than a frictional angle $\gamma_{MAX}$ (the maximum value of an angle with which the lock plates 123 do not slide even when being pushed by the rotation plate 122). Therefore, even when each of the lock plates 123 is pushed by the rotation plate 122, engagement between the outer teeth 123*c* and the inner teeth 124*b* is not released. That is, when a torque is input from the output unit 130, the rotation plate 122 is attempted to rotate. However, even when the lock plates 123 are pushed in the rotation direction in order to rotate the rotation plate 122, engagement between the outer teeth 123c and the inner teeth 124b is not released and thereby, torque is not transferred.

As described above, the output unit 130 is formed with, in one end side, the connection shaft part 131 of which a plurality of irregular parts protrude in an outer circumference. The fitting hole 122c of the rotation plate 122 formed in a shape fitting to the connection shaft part 131, is installed by being fitted to the connection shaft part 131. In the other end side of the output unit 130, for example, a gear part 132 is provided. The gear part 132 is installed so as to protrude to an outer surface 124c that is the opposite side from the surface in which the rotation plate 122 and the lock plates 123 are accommodated, in the internal gear 124. The gear part 132 is engaged to a control target member, for example, a gear mechanism 23 in the lifter mechanism 2.

It is preferable that the sixth spring 128 formed of a belleville spring is installed as the other spring member between the output unit 130 and the outer surface 124c of the internal gear 124. Thereby, in the rotation control unit 120 including the output unit 130 and the internal gear 124, elasticity acts in the direction of separating from each other and backlash between the output unit 130 and the internal gear 124 is absorbed. Moreover, reverse of the output unit 130 due to the input from the output side is prevented during the transfer with the transfer mechanism 110 by friction of the sixth spring 128.

Next, effect of the present embodiment will be described. In the present embodiment, the torque transfer control mechanism 1 is incorporated to the lifter mechanism 2. Thus, in order to move the cushion frame 3 vertically, the lever 111 of the transfer mechanism 110 is rotated in either forward or reverse direction, first. Thereby, the shaft 113 rotates in the same direction to rotate the cam 115 in the same direction. When the cam 115 rotates in the same direction, a state shown in FIG. 5(a) is changed to a state shown in FIG. 5(b) and any of the inclined side surfaces 115b pushes the rollers 116 radially outward. The roller 116 is pushed radially outward, the input plate 121 of the rotation control unit 120 is rotated and the retainer 114 is rotated in the same direction. When the retainer 114 rotates, the retainer protruding piece 114c starts to separate gradually in the rotation direction from the cover protruding piece 112c, and rotates until the retainer protruding piece 114c contacts to any of the cutout end surfaces 112a1 or 112a2 of the cover member 112 by one-time operation of the lever 111 (see FIG. 5(d)).

When the transfer mechanism 110 is rotated in either forward or reverse direction, in this way, the input plate 121 of the rotation control unit 120 rotates. When the input plate 121 rotates, for example, in the clockwise direction of FIG. 6, the lock plate engaging portions 123a, 123a of the lock plates 123, 123 of the one set of a pair of two that face each other diagonally (the first and third lock plates 123, 123) is pushed to the rear end surface in the rotation direction of the first engaged portions 121b, 121b of the input plate 121. Then, the state of FIG. 6(b) is changed to the state of FIG. 6(c), and the outer teeth 123c, 123c of the lock plates 123, 123 of the one set of a pair of two (the first and third lock plates 123, 123) are released from the inner teeth 124b. When the input plate 121 continues to rotate, the state changes from that of FIG. 6(c) to that of FIG. 6(d), the rear end surface in the rotation direction of the second engaged portions 121c, 121c of the input plate 121 contact to the rotation plate engaging portions 122a, 122a and the rotation plate 122 rotates in the same direction. When the rotation plate 122 rotates, by the elastic force in the reduced diameter direction of the third spring 125 and the fourth spring 126, the lock plates 123, 123 of the other set of a pair of two that face each other diagonally (the second and fourth lock plates 123, 123) are attempted to rotate in the same direction, and the outer teeth 123c, 123c of the lock plates 123, 123 of the other set of a pair of two (the second and fourth lock plates 123, 123) slide on the surface (C surface) of engagement with the inner teeth 124b while rotating, and thereby engagement between the outer teeth 123c, 123c and the inner teeth 124b is released.

Then, the output unit 130 that is engaging with the connection shaft part 131 to the fitting hole 122c of the rotation plate 122 rotates to rotate the gear mechanism 23 of the lifter mechanism 2 that is engaging with the gear part 132. By rotation of the gear mechanism 23, the cushion frame 3 displaces in either upward or downward direction. As shown in FIG. 5(d), by one transfer operation by the transfer mechanism 110, the retainer protrusion piece 114c rotates until the retainer protrusion piece 114c contacts to either of the cutout end surfaces 112a1 or 112a2 of the cover member 112. However, by that one operation, the positional relationship of the first engaged portions 121b, 121b of the input plate 121, the rotation plate 122, and the lock plates 123 changes from the position shown in FIG. 6(a) to that shown in FIG. 6(e).

During this, in the transfer mechanism 110, the force is applied in the direction of reducing the diameter of the second spring 118 according to the movement of the lever 111 in the direction described above. When the cushion frame 3 is displaced to a predetermined position, the operation of the lever 111 is stopped. When application of the input torque that makes the lever 111 operated is lost, the second spring 118 returns and attempts to increase its diameter. By the force, the retainer 114 returns to the neutral position in which the retainer protruding piece 114c overlaps the cover protruding piece 112c of the cover member 112, that is, from the position of FIG. 5(d) to the position of FIG. 5(a). Accordingly, the lever 111 also returns to the neutral position. When the input torque is lost, by the elastic force of the first spring 117, the position of the cam 115 with respect to the retainer 114 also returns to the neutral position as described above. In this state, when the lever 111 is rotation operated again in either forward or reverse direction, the cushion frame 3 is displaced in either upward or downward direction as described above via the rotation control unit 120 and the output unit 130.

On the other hand, when application of the input torque that makes the lever 111 operated is lost, in the rotation control unit 120, the torque of the input plate 121 that operates the lock plates 123, 123 is lost. Thus, the lock plates 123, 123 are energized in the direction in which the bottom surface parts 123b, 123b are pushed to the inclined side surfaces 122b, 122b of the rotation plate 122 by the elastic force of the third spring 124 and the fourth spring 125. Then, since the rotation plate 122 is formed to be a substantially rhombus shape that is a tapered shape of which width narrows as going outward, the rotation plate 122 is displaced radially outward along the inclined side surfaces 122b, 122b, each of the outer teeth 123c, 123c engages with the inner teeth 124b to become the locked state, and the rotation plate 122 and the lock plates 123, 123 are maintained in a state of being rotated at a predetermined angle from the position before operation (see FIG. 6(e)). When operation of the lever 111 in either forward or reverse direction in the transfer mechanism 110 is repeated intermittently and a state where the input torque is not applied is established, the lifter mechanism 2 adjusts the cushion frame 3 to a predetermined height.

In the locked state where the input torque is not applied and each of the outer teeth 123c, 123c of the lock plates 123, 123 engages with the inner teeth 124b as described above, when input is performed from the cushion frame 3 side via the output unit 130, the rotation plate 122 connected to the output unit 130 attempts to rotate. However, in this case, the rotation plate 122 cannot rotate as described above and engagement between the outer teeth 123c, 123c and the inner teeth 124b is not released. That is, a load from the cushion frame 3 side is a force to rotate the output unit 130, and when the output unit 130 attempts to rotate, the rotation plate 122 fitted with the connection shaft part 131 attempts to rotate next. However, even when the rotation plate 122 attempts to rotate and pushes each of the lock plates 123, 123 in the rotation direction, because of the angular setting as described above, engagement of the outer teeth 123c, 123c of the lock plates 123, 123 with respect to the inner teeth 124b is not released. Thereby, in the present embodiment, there is no displacement such as the height of the cushion frame 3 being reduced gradually, unlike the conventional one. When, instead of the manual lever 111, a motor (not shown) is connected to the base part 111a and an electric operation mechanism is configured so that the base part 111a rotates in the forward and reverse directions electrically, even when the output unit 130 attempts to rotate, the locked state described above by the lock plates 123 is maintained. Thus, such configuration reduces a burden on the motor and can contribute to the breakage prevention of the motor.

In the present embodiment, for example, when rotation is performed in clockwise of FIG. 6, the lock plates 123, 123 of the one set of a pair of two that face each other diagonally (the first and third lock plates 123, 123) move synchronously. After that, by the elastic force in the reduced diameter direction of the third spring 125 and the fourth spring 126, the lock plates 123, 123 of the other set of a pair of two that face each other diagonally (the second and fourth lock plates 123, 123) move synchronously. That is, while four lock plates 123 are used, two plates move synchronously, and thereby similar smooth movement to the one in a configuration of two lock plates can be secured.

Figure 9:
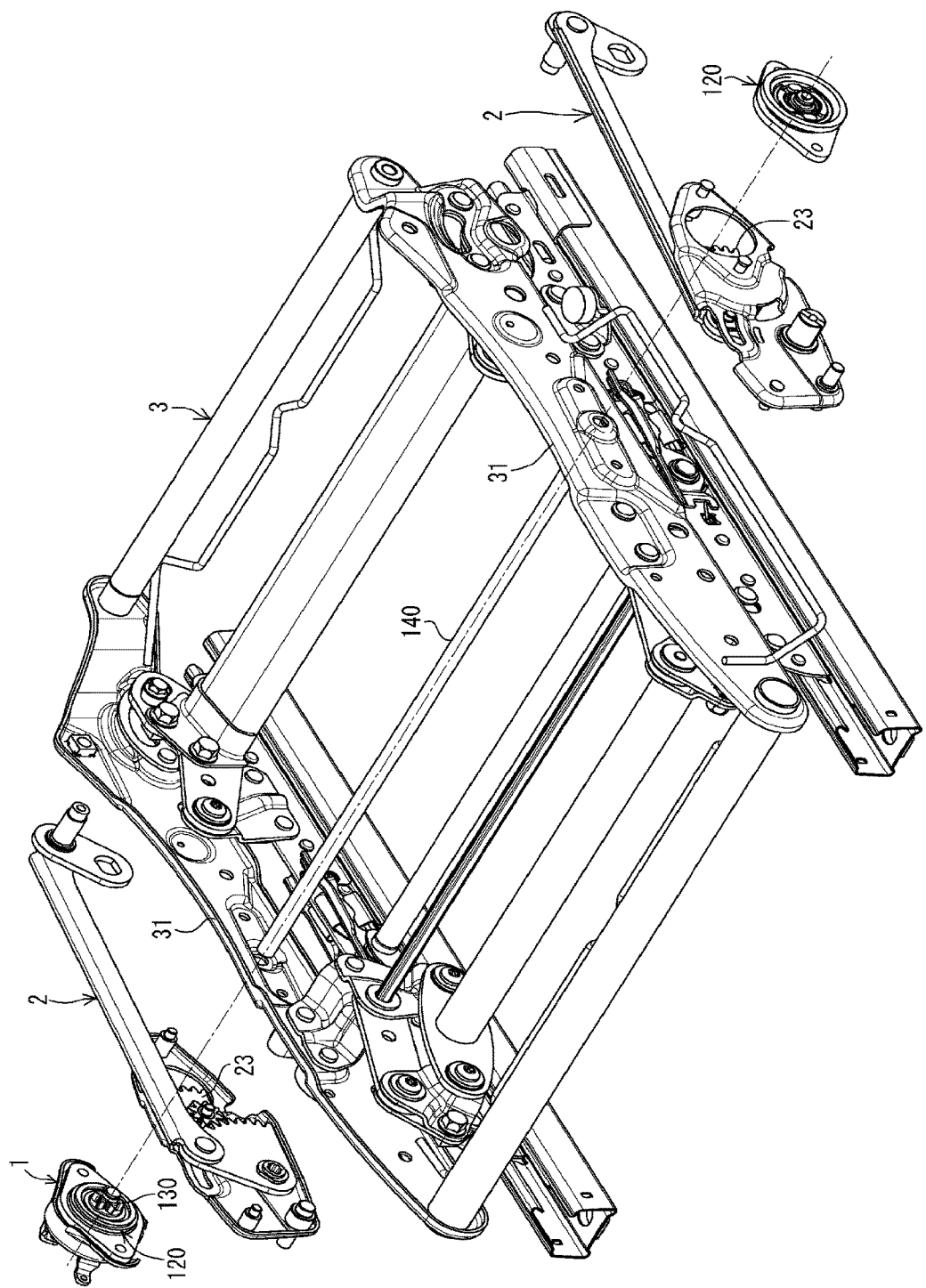
FIG. 9 is a perspective view showing a mode in which a rotation movement control mechanism is installed in one side frame of the cushion frame and a part of a mechanism of the rotation movement control mechanism is arranged in the other side frame.

The present invention is not limited to the embodiment described above. For example, in the embodiment described above, in the cushion frame 3, only in one side frame 31, the rotation movement control mechanism 1 incorporated to the lifter mechanism 2 is installed. However, as shown in FIG. 9, it may be configured so that, while similar rotation movement control mechanism 1 to the one described above is installed in one side frame 31 of the cushion frame 3, the other side frame 31 is installed with a structure that excludes the transfer mechanism 110 and includes the rotation control unit 120 and the output unit 130. In this case, since the transfer mechanism 110 is provided only in one side, in order to synchronize right and left, a right and left connection rod 140 is bridged between the right and left output units 130, 130. Thereby, when the transfer mechanism 110 located at one side is operated, the right and left rotation control units 120 synchronize and move. Thus, a load applied per each of the rotation control units 120 can be reduced and load resistant strength can be set higher than the configuration in which the mechanism is disposed only in one side.

Figure 10:
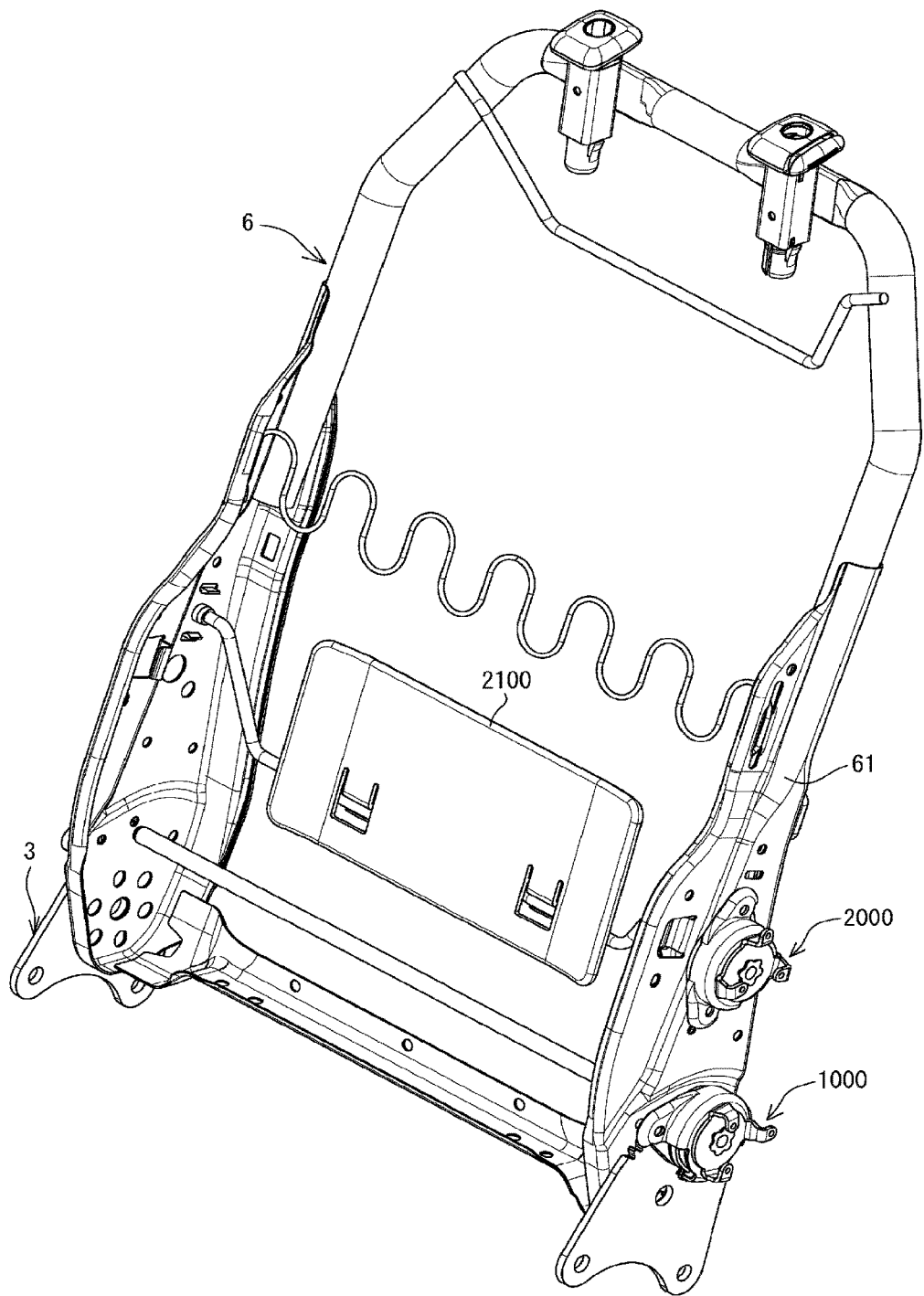
FIG. 10 is a diagram showing an example of a back frame in which the rotation movement control mechanism is arranged as a reclining adjuster and a lumbar adjuster.

FIG. 10 illustrates examples of when the rotation movement control mechanism 1 described above is disposed as a reclining adjuster 1000 in a boundary between the cushion frame 3 and the back frame 6, and when the rotation movement control mechanism 1 described above is disposed as a lumbar adjuster 2000 that can move a lumbar support 2100 to front and back, in a side frame 61 of the back frame 6. As shown in FIG. 10, the rotation movement control mechanism 1 may be disposed in both of the reclining adjuster 1000 and the lumbar adjuster 2000. In addition to that, the rotation movement control mechanism 1 may be concurrently used as the lifter mechanism of the embodiment described above, and also, may be used in at least any one position thereof.

EXPLANATION OF REFERENCES

1 Rotation movement control mechanism
2 Lifter mechanism
3 Cushion frame
31 Side frame
110 Transfer mechanism
111 Lever
112 Cover member
113 Shaft
114 Retainer
115 Cam
116 Roller
117 First spring
118 Second spring
120 Rotation control unit
121 Input plate
121b First engaged portion
121c Second engaged portion
122 Rotation plate
123 Lock plate
124 Internal gear
125 Third spring
126 Fourth spring
127 Fifth spring
128 Sixth spring
130 Output unit

The invention claimed is:
1. A torque transfer control mechanism comprising:
a transfer mechanism that rotates in a range of a predetermined angle from a neutral position by application of an input torque and returns to the neutral position by a return spring when application of the input torque is lost; and
a rotation controller that is in a locked state when the input torque rotating the transfer mechanism is not applied, is in a lock-released state when the transfer mechanism rotates by the input torque, and transfers torque to an output during the lock-released state,
the transfer mechanism and the rotation controller being coupled,
wherein the output is rotated by applying the input torque to the transfer mechanism,
the rotation controller having:
an internal gear that is formed with inner teeth in an inner circumference,
a plurality of lock plates that are installed in an inner circumferential range of the internal gear, engage with the inner teeth of the internal gear in the locked state, and are formed with outer teeth of which engagement with the inner teeth is released in the lock-released state, in an outer circumferential surface, wherein the lock plates have a same shape and size,
a rotation plate that includes a contact surface guiding each of the lock plates radially outward, the contact surface located between the rotation plate and the lock plates, the torque transfer control mechanism being configured so that the predetermined angle between the contact surface between the rotation plate and the lock plates and a contact surface between the inner teeth of the internal gear and the outer teeth of the lock plates is set smaller than a friction angle, and engagement between the outer teeth of the lock plates and the inner teeth of the internal gear is not released when a torque is applied from the output in the locked state, wherein the rotation plate is formed to be in a shape with four substantially equal length angled surfaces that constitute inclined side surfaces, wherein one of the inclined side surfaces of the rotation plate is the contact surface between the rotation plate and the lock plates, a spring member that energizes the lock plates in a direction of approach to the inclined side surfaces of the rotation plate is installed, the lock plates are configured so that the lock plates are pushed radially outward along the inclined side surfaces of the rotation plate and are energized in a direction of engaging with the inner teeth of the internal gear by being energized in the direction of approaching to the inclined side surfaces of the rotation plate by the spring member, and an elastic force of the spring member reduces backlash between components including the internal gear, the lock plates, and the rotation plate, wherein the plurality of lock plates are installed corresponding to each of the inclined side surfaces of the rotation plate of the shape, an input plate is further included that has first engaged portions engaging with engaging portions provided in each of the plurality of lock plates and second engaged portions engaging with engaging portions provided in the rotation plate, and rotates by the input torque, when the input plate rotates, among the lock plates engaged via the first engaged portions, one pair of lock plates that face each other diagonally and are towed in a rotation direction according to the rotation of the input plate, rotate in the same direction, and engagement between the outer teeth of the lock plates and the inner teeth of the internal gear is released, by the input plate further rotating in the same direction, the rotation plate engaged via the second engaged portions is rotated, a gap is instantly generated in a space with the inclined side surfaces of the rotation plate, engagement between the outer teeth of another pair of the lock plates that face each other diagonally and the inner teeth of the internal gear is released by the elastic force of the spring member and the lock-released state is established, by rotation of the rotation plate, the output connected to the rotation plate rotates, and when application of the input torque is lost, by the elastic force of the spring member, each of the lock plates is energized in the direction of approaching to the inclined side surfaces of the rotation plate and is pushed out along the inclined side surfaces of the rotation plate, the outer teeth of each of the lock plates engage with the inner teeth of the internal gear and the locked state is established.

2. The torque transfer control mechanism according to claim 1, wherein the spring member is provided corresponding to each set of the lock plates to energize two of the lock plates of which bottom surface parts are adjacent to each other in a circumferential direction and that slide in the same direction along the inclined side surfaces of the rotation plate, in the direction of approach to the inclined side surfaces.

3. The torque transfer control mechanism according to claim 1, wherein a spring member that energizes the rotation controller and the output in a separating direction is further provided between the rotation controller and the output.

4. The torque transfer control mechanism according to claim 1, wherein the transfer mechanism comprises a manual operation mechanism or an electric operation mechanism, and is configured so that the input torque is applied manually or electrically.

5. The torque transfer control mechanism according to claim 1, that is incorporated in a lifter mechanism of a seat structure, a reclining mechanism, or a lumbar control mechanism.

6. A seat structure characterized by comprising a lifter mechanism, a reclining mechanism, or a lumbar control mechanism, wherein the torque transfer control mechanism according to claim 1 is incorporated.

* * * * *